US012624132B2

(12) United States Patent
Marion et al.

(10) Patent No.: US 12,624,132 B2
(45) Date of Patent: May 12, 2026

(54) LIQUID POLYMERIZABLE ALLYLIC COMPOSITIONS COMPRISING LAKE PIGMENTS

(71) Applicant: Essilor International, Charenton-le-Pont (FR)

(72) Inventors: Laurie Marion, Bangkok (TH); Pierre Fromentin, Bangkok (TH); Tipparat Lertwattanaseri, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 263 days.

(21) Appl. No.: 18/269,496

(22) PCT Filed: Dec. 20, 2021

(86) PCT No.: PCT/EP2021/086751
§ 371 (c)(1),
(2) Date: Jun. 23, 2023

(87) PCT Pub. No.: WO2022/136250
PCT Pub. Date: Jun. 30, 2022

(65) Prior Publication Data

US 2024/0400725 A1 Dec. 5, 2024

(30) Foreign Application Priority Data

Dec. 23, 2020 (EP) .................................... 20306671

(51) Int. Cl.
*C08K 5/132* (2006.01)
*C08F 2/44* (2006.01)
*C08F 22/10* (2006.01)
*C08K 5/00* (2006.01)
*G02B 1/04* (2006.01)

(52) U.S. Cl.
CPC ............ *C08F 2/44* (2013.01); *C08F 22/1006* (2020.02); *C08K 5/0041* (2013.01); *C08K 5/132* (2013.01); *G02B 1/041* (2013.01)

(58) Field of Classification Search
USPC .......................................................... 528/425
See application file for complete search history.

(56) References Cited

U.S. PATENT DOCUMENTS 8,133,414 B2 * 3/2012 Gallas .................... G02C 7/102
359/356

FOREIGN PATENT DOCUMENTS

| | | | |
|---|---|---|---|
| CN | 111100410 | A | 5/2020 |
| EP | 3382428 | A1 | 10/2018 |
| JP | 2004139050 | A | 5/2004 |
| WO | 2019110264 | A1 | 6/2019 |

OTHER PUBLICATIONS

International Search Report for PCT/EP2021/086751 mailed Apr. 19, 2022, 2 pages.
Written Opinion of the ISA for PCT/EP2021/086751 mailed Apr. 19, 2022, 4 pages.

* cited by examiner

*Primary Examiner* — Terressa Boykin
(74) *Attorney, Agent, or Firm* — NIXON & VANDERHYE

(57) ABSTRACT

Disclosed is a polymerizable liquid composition for the manufacture of an optical article, including: a) at least one allyl monomer or allyl oligomer, b) at least one initiator for the polymerization of the allyl monomer or allyl oligomer, and c) at least one lake pigment including an organic ionic colorant and at least one compound including metal atoms having a charge opposite to that of the organic ionic colorant, d) wherein the lake pigment is not contained in nanoparticles, which are not the lake pigment itself, if the lake pigment is in the form of particles dispersed in the composition.

20 Claims, No Drawings

LIQUID POLYMERIZABLE ALLYLIC COMPOSITIONS COMPRISING LAKE PIGMENTS

This application is the U.S. national phase of International Application No. PCT/EP2021/086751 filed Dec. 20, 2021 which designated the U.S. and claims priority to EP 20306671.7 filed Dec. 23, 2020, the entire contents of each of which are hereby incorporated by reference.

The present invention relates to optical articles comprising light absorbing additives and more particularly to polymerizable compositions comprising light absorbing additives that can be polymerized into an optical article.

It is often desired to incorporate a light absorbing additive (LAA) in an optical article such as an ophthalmic lens. The reason thereof can be related to the health of the user of the optical article or to their comfort or to cosmetic aspects.

For example ultra-violet (UV) light (in particular the UVB and UVA range corresponding respectively to wavelengths comprised between 280 and 315 nm and between 315 and 380 nm), high energy visible (HEV) light (especially the wavelength range comprised between 380 and 450 nm corresponding to violet and blue light) and near infrared light (NIR; corresponding to the wavelength range from 780 to 1400 nm) have been shown to have adverse effects when the eye is exposed to excessive amounts of radiations in those wavelengths ranges.

Ophthalmic lenses comprising UV LAA or HEV LAA or NIR LAA can thus be used to protect the health of the wearer of said ophthalmic lens.

HEV LAA and, in most cases, UV LAA or NIR LAA absorb in the visible range, imparting an unaesthetic color to the lens. This is detrimental to the color perception of the wearer and in terms of cosmetic aspects. Resulting lenses may not be accepted by wearers, especially when considering non solar products. LAA absorbing in the visible range may be added to neutralize the color brought by the UV LAA or HEV LAA or NIR LAA. In this case, the LAA absorbing in the visible range acts as a color balancing agent.

Different methods can be used to incorporate LAA into optical articles. For example, impregnation or imbibition methods consist in dipping a polymerized substrate, such as a lens substrate, in a bath containing a LAA dissolved or dispersed in an organic solvent. The LAA can also be comprised in a coating deposited onto the surface of the optical article substrate.

However, incorporating the LAA directly in the polymerizable composition from which the substrate is obtained remains the preferred technique, as it does not require extra-processing steps to incorporate the LAA and it allows the LAA to be incorporated in relatively low concentrations. When the LAA is confined in a relatively thin layer in the article (which is the case when the LAA is comprised in a coating layer or in an impregnated layer), higher concentrations are needed which can deteriorate, for example, the mechanical properties of the article.

A known class of substrate material is the class of allylic substrates, which results from the polymerization or copolymerization of allyl monomers and/or allyl oligomers such as CR-39®. The polymerization or copolymerization of these substrate materials necessitates that the polymerizable compositions comprise an initiator for initiating the polymerization or copolymerization, such as a peroxide, for example diisopropyl peroxydicarbonate (IPP).

Under the reaction conditions for the polymerization of allylic substrates, the initiators or other reactive intermediates produced during the polymerization reaction may react with LAA and may degrade them. Imparting color to or balancing the color of an allylic substrate by incorporating a LAA directly in the polymerizable composition from which the substrate is obtained thus remains challenging.

WO 2019/110264 discloses the use of LAA contained in nanoparticles acting as color balancing agents in polymerizable composition for the preparation of allylic lens substrates. The fact that these LAA are contained in nanoparticles protects them from degradation under the reaction conditions for the polymerization of allylic lens substrates. However, the preparation of the nanoparticles requires additional processing steps.

EP 3382428 discloses the use of specific peroxide initiators with a single peroxycarbonate group (thus different from, for example, IPP) in polymerizable composition for the preparation of allylic lens substrates. The use of these initiators allows to avoid the degradation of some LLA (in this case acting as color balancing agents) under the reaction conditions for the polymerization of allylic lens substrates. However, these initiators provide a solution to the problem only for some dyes while some other dyes are still degraded when these initiators are used.

There is thus a need in the industry for alternative polymerizable composition for the preparation of allylic substrates for optical articles, such as allylic lens substrates, comprising LAA such that the LAA are not degraded during the polymerization process.

Inorganic pigments particles are LAA known to resist degradation when exposed to peroxide initiators. However, they proved unsuitable for use in polymerizable composition for the preparation of allylic lens substrates comprising LAA because the large pigment particles diffuse light and increase the haziness of a lens.

Less is known about the stability of organic pigments towards peroxide initiators. In general, organic dyes and organic pigments comprise molecules having electron-rich moieties as well as donor groups. One therefore expects organic dyes and some organic pigments to be particularly sensitive to oxidation.

It is therefore not obvious for the person skilled in the art that organic pigments will not be degraded under the reaction conditions for the polymerization of allylic substrates and/or will not diffuse light in such a way that they increase the haziness of an optical article, such as a lens.

It is the merit of the Applicant to have discovered that a specific type of organic pigments known as lake pigments unexpectedly resists degradation when used as LAA in polymerizable composition for the preparation of allylic substrates despite the presence of a peroxide initiator. Moreover, the applicant discovered that the optical articles obtained from such polymerizable composition comprising LAA have a surprisingly low level of haze.

SUMMARY

One aspect of the present invention is related to a polymerizable liquid composition for the manufacture of an optical article, comprising:

a) at least one allyl monomer or allyl oligomer, b) at least one initiator for the polymerization of said allyl monomer or allyl oligomer, and c) at least one lake pigment comprising an organic ionic colorant and at least one compound comprising metal atoms having a charge opposite to that of the organic ionic colorant.

In some embodiments the present invention is related to a polymerizable liquid composition for the manufacture of an optical article, comprising:

a) at least one allyl monomer or allyl oligomer,
b) at least one initiator for the polymerization of said allyl monomer or allyl oligomer,
c) at least one lake pigment comprising an organic ionic colorant and at least one compound comprising metal atoms having a charge opposite to that of the organic ionic colorant, and
d) at least one light absorbing additive other than the at least one lake pigment selected from the group consisting of a colorant such as a dye or a pigment; a colorless light-absorbing additive; and mixtures thereof; preferably the light absorbing additive is a UV absorber and/or a HEV-light absorber.

Another aspect of the present invention is related to a process for the preparation of a polymerizable liquid composition of the invention, comprising the steps of:

a) providing an allyl monomer or allyl oligomer;
b) providing an initiator for the polymerization of said allyl monomer or allyl oligomer;
c) providing at least one lake pigment;
d) optionally providing a light absorbing additive other than the at least one lake pigment selected from the group consisting of a colorant such as a dye or a pigment, a colorless light-absorbing additive, and mixtures thereof; preferably the light absorbing additive other than the at least one lake pigment is a UV absorber and/or a HEV-light absorber;
d) mixing said allyl monomer or allyl oligomer, said initiator, said at least one lake pigment and, said light-absorbing additive other than the at least one lake pigment, when applicable.

Another aspect of the present invention is related to the use of a lake pigment dispersed in a polymerizable liquid composition of the invention as a colorant capable of tolerating an initiator for the polymerization of an allyl monomer or allyl oligomer.

Another aspect of the present invention is related to an optical article obtained by a process comprising the curing of the polymerizable liquid composition of the invention.

DETAILED DESCRIPTION OF THE INVENTION

An object of the present invention is a polymerizable liquid composition for the manufacture of an optical article, which comprises:

a) at least one allyl monomer or allyl oligomer,
b) at least one initiator for the polymerization of said allyl monomer or allyl oligomer, and
c) at least one lake pigment comprising an organic ionic colorant and at least one compound comprising metal atoms having a charge opposite to that of the organic ionic colorant.

In the polymerizable liquid compositions of the invention, the at least one lake pigment may be used to provide color to the finished article and/or to act as a color balancing agent.

In the following, it should be understood that the expression "light absorbing additive" or the acronym LAA refers to the light absorbing additive other than the at least one lake pigment.

The Applicant has found that lake pigments tolerate initiators for the polymerization of allyl monomers and/or oligomers much better than what would be expected of a typical organic colorant. Moreover, in contrast to what has been observed with other types of pigments, which were known to tolerate initiators for the polymerization of allyl monomers and/or oligomers, it is possible to obtain optical articles, such as lenses, with low level of haze by curing the composition of the invention.

Without wishing to be bound to a theory, it is believed that the presence of compounds comprising metal atoms in the pigment plays a role in their unexpected tolerance to initiators for the polymerization of allyl monomers and/or oligomers.

As defined herein, a lake pigment, also called a "lake", is a colorant insoluble in water comprising an organic ionic colorant and at least one compound comprising metal atoms having a charge opposite to that of the organic ionic colorant, wherein

- the organic ionic colorant is anionic and the at least one compound comprising metal atoms is a non-alkali metallic cation, or
- the organic ionic colorant is cationic and the at least one compound comprising metal atoms is an anionic coordination complex comprising metal atoms.

As defined herein, a mixture of lake pigments is also a lake pigment.

As defined herein a metal atom can be an alkali metal atom (Li, Na, K, Rb, Cs and Fr), an alkaline earth metal (Be, Mg, Ca, Sr, Ba and Ra), a transition metal atom, a lanthanide atom, an actinide atom, Al, Ga, In, Sn, TI, Pb, Bi, Po or a metalloid atom (B, Si, Ge, As, Sb, Te). Therefore, a non-alkali metallic cation can comprise any cation obtained from an alkaline earth metal (Be, Mg, Ca, Sr, Ba and Ra), a transition metal atom, a lanthanide atom, an actinide atom, Al, Ga, In, Sn, TI, Pb, Bi, Po or a metalloid atom (B, Si, Ge, As, Sb, Te) by removal of one or more electrons from said atom.

Lake pigments may be obtained from a solution of the ionic organic colorant or of a conjugate acid of the ionic organic colorant or of a conjugate base of the ionic organic colorant by the adjunction of an amount of the at least one compound comprising metal atoms or an acid form of said compound or a basic form of said compound that is sufficient to insolubilize the ionic organic colorant or its conjugate acid or its conjugate base.

As defined herein, an acid form of a compound means a form of this compound stable in acidified water and a basic form of a compound means a form of this compound stable in basified water.

When the lake pigments are obtained according to the process described just above, it is preferred that the at least one compound comprising metal atoms used to insolubilize the ionic organic colorant in the preparation of the lake pigment is itself soluble in the solvent in which said preparation takes place. Preferably this solvent is water.

According to the invention, it is preferred that the at least one compound comprising metal atoms comprised in the lake pigment is such that an alkali metal salt of the at least one compound comprising metal atoms or a halide salt of said compound or an acid form of said compound or a basic form of said compound is soluble in water.

According to the invention, it is preferred that the ionic organic colorant comprised in the lake pigment is such that an alkali metal salt of the ionic organic colorant or a halide salt of the ionic organic colorant or a conjugate base of the ionic organic colorant or a conjugate acid of the ionic organic colorant is soluble in water.

In a given amount of lake pigment, the total charge of the quantity of ionic organic colorant comprised in said amount of lake pigment need not be exactly balanced by the total charge of the quantity of the at least one compound comprising metal atoms comprised in said amount of lake pigment.

According to the invention, it is preferred that the total charge of the quantity of the at least one compound comprising metal atoms comprised in the composition is comprised between 50% and 150%, preferably between 80% and 120% of the opposite of the total charge of the quantity of the ionic organic colorant comprised in the composition.

Alternatively or additionally, the total charge of the quantity of the at least one compound comprising metal atoms comprised in the amount of lake pigment comprised in the composition may be comprised between 50% and 150%, preferably between 80% and 120% of the opposite of the total charge of the quantity of the ionic organic colorant comprised in the amount of lake pigment comprised in the composition.

According to the invention, it is to be understood that the organic ionic colorant may be a single chemical compound or a mixture of chemical compounds.

Preferred organic ionic colorants may be derived from azo dyes, polymethine dyes, arylmethine dyes, pyrazolone dyes, anthraquinone dyes, isoindolinone dyes, quinophthalone dyes, naphthalenediamine dyes, and carbonyl dyes.

According to the invention, when the ionic organic colorant is anionic, it is preferably the conjugate base of an acidic colorant. Preferably, the anionic organic colorant comprised in the lake pigments comprised in the polymerizable liquid composition of the invention comprises carboxylate groups ($RCO_2^-$) and/or sulfonate groups ($RSO_3^-$).

According to the invention, when the ionic organic colorant is cationic, it is preferably the conjugate acid of a basic colorant, for example a colorant comprising one or more amino groups or a colorant comprising one or more tetravalent nitrogen atoms.

According to the invention, the non-alkali metallic cation comprised in the lake pigment can consist in identical non-alkali metallic cations or in a mixture of non-alkali metallic cations.

Preferably, when the ionic organic colorant comprised in the lake pigment comprised in the polymerizable liquid composition of the invention is anionic, the compound comprising metal atoms is a non-alkali metallic cation selected from $Mg^{2+}$, $Al^{3+}$, $Ca^{2+}$, $Cr^{3+}$, $Mn^{2+}$, $Fe^{2+}$, $Fe^{3+}$, $Co^{3+}$, $Ni^{2+}$, $Cu^{2+}$, $Zn^{2+}$, $Ba^{2+}$, $Sr^{2+}$, and mixtures thereof. Preferably the non-alkali metallic cation doesn't comprise alkaline earth cations, more preferably the non-alkali metallic cation is a trivalent cation, even more preferably the non-alkali metallic cation is $Al^{3+}$.

Indeed, the applicant observed that, with some lake pigments comprising an anionic organic colorant, when the non-alkali metallic cation comprised in the lake pigment is an alkaline earth cation, the resistance of the lake pigment to degradation under the reaction conditions for the polymerization of allylic substrates was not as good as when the non-alkali metallic cation comprised in the lake pigment is not an alkaline earth cation.

According to the invention, the anionic coordination complex comprising metal atoms comprised in the lake pigment can be a single chemical compound or a mixture of anionic coordination complex comprising metal atoms.

Preferably, when the ionic organic colorant comprised in the lake pigment comprised in the polymerizable liquid composition of the invention is cationic, the at least one compound comprising metal atoms is an anionic coordination complex comprising metal atoms selected from polyoxometalates, copper (I) hexacyanoferrate (II) ($[Cu_3Fe(CN)_6]^-$), and mixtures thereof.

As defined herein, a polyoxometalate is a polyatomic anion, that comprises three or more transition metal atoms in their highest oxidation states selected from Mo, W, V, and mixtures of these, linked together by oxygen atoms. Polyoxometalates can also comprise heteroatoms (i.e. atoms that are neither oxygen nor V, Nb, Ta, Mo, or W) such as phosphorus, silicon, cobalt, aluminum, manganese, chromium, nickel, or mixtures of these. When present, these heteroatoms and the network formed by the oxygen atoms and the three or more transition metal atoms selected from Mo, W, V, and mixtures of these, are linked together by oxygen atoms. Polyoxometalates comprising heteroatoms are called heteropolyoxometalates.

Polyoxometalates are typically obtained by acidifying solutions of tungstates, molybdates, and/or vanadates in the form of the alkali metal salts and/or ammonium salts. When such acidification is conducted in the presence of heteroatoms, e.g. phosphates and/or water-soluble silicates, a heteropolyoxometalate can be obtained. By selecting the ratios of tungstate, molybdate, vanadate, and optionally of phosphate and silicate, it is possible to synthesize various polyoxometalates.

Preferred examples of polyoxometalates that may be comprised in the lake pigment comprised in the polymerizable liquid composition of the invention include phosphotungstates, phosphomolybdates, silicomolybdates, silicotungstates, phosphosilicotungstates, phosphosilicomolybdates, phosphomolybdotungstates, silicomolybdotungstates, phosphosilicomolybdotungstates, phosphovanadomolybdates, phosphovanadotungstates, silicovanadomolybdates, silicovanadotungstates, phosphovanadomolybdotungstates, silicovanadomolybdotungstates, and mixtures thereof.

In the polymerizable liquid composition of the invention, the at least one lake pigment is preferably chosen from:

A phosphomolybdotungstate salt of N-methyl derivatives of 4-[(4-aminophenyl)-(4-methyliminocyclohexa-2,5-dien-1-ylidene)methyl]aniline, a mixture of aluminium, 7-hydroxy-8-[(4-sulfo-1-naphthalenyl)azo]-1,3-naphthalenedisulfonic acid complex and (E)-3,3'-dioxo-1H,1'H,3H,3'H-[2,2'-biindolylidene]-5,5'-disulfonic acid aluminium, a mixture of dihydrogen (ethyl)[4-[[4-[ethyl(3-sulphonatobenzyl)amino]phenyl](2-sulphonatophenyl)methylene]cyclohexa-2,5-dien-1-ylidene](3-sulphonatobenzyl)ammonium, aluminium salt and dialuminium tris [2-(2,4,5,7-tetrabromo-6-oxido-3-oxoxanthen-9-yl)-3,4,5,6-tetrachlorobenzoate], a mixture of tris[5-amino-4-hydroxy-3-(phenylazo)naphthalene-2,7-disulphonato(2-)]dialuminium and dihydrogen (ethyl)[4-[[4-[ethyl(3-sulphonatobenzyl)amino]phenyl](2-sulphonatophenyl)methylene]cyclohexa-2,5-dien-1-ylidene](3-sulphonatobenzyl)ammonium, aluminium salt.

In some embodiments, the lake pigment is totally dissolved in the composition of the invention. In other embodiments, the lake pigment is partially or totally insoluble in the composition of the invention. In these embodiments, the portion of the lake pigment that is not dissolved in the composition is dispersed in the composition.

In some embodiments, the lake pigment is totally dissolved in the allyl monomer or allyl oligomer comprised in the composition of the invention. In other embodiments, the lake pigment is partially or totally insoluble in the allyl monomer or allyl oligomer comprised in the composition of the invention.

In these embodiments, the portion of the lake pigment that is not dissolved in the allyl monomer or allyl oligomer comprised in the composition is then preferably present in the polymerizable liquid composition of the invention in the form of particles dispersed in the composition. Preferably, these particles have a size (for example the diameter in the case of spherical particles) that is lower than 1 μm, more preferably lower than 500 nm, even more preferably lower than 300 nm. When dynamic light scattering is used to measure the size of the particles, the output parameter called Z-average is preferably used to measure the size of the particles. Preferably, the Z-average of the lake pigment particles comprised in the polymerizable liquid composition of the invention is lower than 1 μm, more preferably lower than 500 nm, even more preferably lower than 300 nm, as measured by dynamic light scattering.

In the polymerizable liquid composition of the invention, it is preferred that the amount of lake pigment is from 1 to 40 ppm, more preferably from 1 to 25 ppm, even more preferably from 5 to 25 ppm, most preferably from 5 to 15 ppm by weight relative to the total weight of the composition.

In some embodiments, the polymerizable liquid composition of the invention further comprises at least one light absorbing additive other than the at least one lake pigment selected from the group consisting of a colorant such as a dye or a pigment; a colorless light-absorbing additive; and mixtures thereof; preferably the light absorbing additive is a UV absorber and/or a HEV-light absorber.

Thus, according to these embodiments, the present invention is a polymerizable liquid composition for the manufacture of an optical article, which comprises:

a) at least one allyl monomer or allyl oligomer,
b) at least one initiator for the polymerization of said allyl monomer or allyl oligomer,
c) at least one lake pigment comprising an organic ionic colorant and at least one compound comprising metal atoms having a charge opposite to that of the organic ionic colorant, and
d) at least one light absorbing additive other than the at least one lake pigment selected from the group consisting of a colorant such as a dye or a pigment; a colorless light-absorbing additive; and mixtures thereof; preferably the light absorbing additive is a UV absorber and/or a HEV-light absorber.

Preferably, the light absorbing additive other than the at least one lake pigment has the following structure

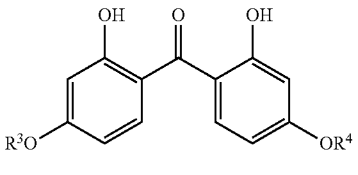

wherein $R^3$ and $R^4$ are each independently chosen from H or an alkyl chain having from 1 to 12 carbon, preferably wherein $R^3$ and $R^4$ are methyl groups.

In the polymerizable liquid composition of the invention, it is preferred that the amount of the light absorbing additive other than the at least one lake pigment is below 2%, more preferably below 1%, even more preferably below 0.5% by weight relative to the total weight of the composition.

In the polymerizable liquid composition of the invention comprising a LAA other than the at least one lake pigment, it is preferred that the amount of LAA is from 0.01% to 2%, more preferably below from 0.02% to 1%, even more preferably from 0.05% to 0.5% by weight relative to the total weight of the composition.

In one embodiment of the polymerizable liquid composition of the invention, the light absorbing additive other than the at least one lake pigment is contained in nanoparticles which are dispersed in the allyl monomer or allyl oligomer.

The at least one lake pigment comprised in the polymerizable liquid composition of the invention is not contained in nanoparticles, which are not the lake pigment particles themselves, where applicable.

As used herein, the expressions "a LAA contained in nanoparticles" (according to one embodiment of the present invention) or "a lake pigment contained in nanoparticles" (not according to the present invention) mean any one of a LAA or a lake pigment homogeneously dispersed in nanoparticles, a LAA or a lake pigment localized in the core of nanoparticles, a LAA or a lake pigment localized at the surface of nanoparticles, and a LAA or a lake pigment localized inside the porosity of nanoparticles.

When the polymerizable liquid composition according to the invention comprises LAA contained in nanoparticles, said nanoparticles are dispersed in the polymerizable composition.

Nanoparticles behave like capsules, in which light-absorbing additives are protected. Indeed, active reactants from the composition according to the invention, e.g. the initiator for the polymerization of the allyl monomer or allyl oligomer or other reactive intermediates produced during the polymerization reaction, will not be able to diffuse in the internal part of nanoparticles. If light-absorbing additives are located on the surface or in porosity of nanoparticles, active reactants may reach them, but as mobility of grafted or trapped additives is hindered, probability of reaction is lowered, and additives are also protected.

In the context of the present invention, the term "nanoparticles" is intended to mean individualized particles of any shape having Z-average in the range of 1 nm to 10 μm, preferably in the range of 10 nm to 5 μm, more preferably in the range of 10 nm to 1 μm, even more preferably in the range of 10 nm to 500 nm as measured by dynamic light scattering.

Having LAA contained in nanoparticles in the polymerizable liquid composition of the invention can be useful if the LAA is prone to degradation by the initiator for the polymerization of the allyl monomer or allyl oligomer.

In the polymerizable liquid composition according to the invention, the allyl monomer or allyl oligomer is preferably selected from the group consisting of diethylene glycol bis(allyl carbonate), ethylene glycol bis(allyl carbonate), oligomers of diethylene glycol bis(allyl carbonate), oligomers of ethylene glycol bis(allyl carbonate), bisphenol A bis(allyl carbonate), diallyl phthalate, diallyl isophthalate, diallyl terephthalate, and mixtures thereof.

In the polymerizable liquid composition of the invention, it is preferred that the amount of allyl monomer or allyl oligomer is from 70% to 99%, more preferably from 80% to 98%, even more preferably from 90% to 97% by weight relative to the total weight of the composition.

In the polymerizable liquid composition according to the invention, the initiator for the polymerization of the allyl monomer or allyl oligomer is preferably selected from a peroxydicarbonate, a peroxycarbonate, a peroxyester, a perketal, and mixtures thereof. More preferably, the initiator for the polymerization of said allyl monomer or allyl oligomer is selected from diisopropyl peroxydicarbonate, 1,1-dimethylpropyl 1-methoxycyclohexyl peroxide, benzoyl peroxide, methyl ethyl ketone peroxide, di-t-butyl peroxide, lauroyl peroxide, acetyl peroxide, bis(4-t-butylcyclohexyl) peroxydicarbonate, t-butyl peroxy-2-ethylhexanoate, t-hexyl peroxy-2-ethylhexanoate, 1,1-bis(t-butylperoxy)cyclohexane, 1,1-bis(t-amylperoxy)cyclohexane, t-amyl (2-ethylhexyl) monoperoxycarbonate, t-butyl (2-ethylhexyl) monoperoxycarbonate, t-butyl isopropyl monoperoxycarbonate, poly(tert-butyl peroxycarbonate) polyether, and mixtures thereof. Even more preferably, the initiator for the polymerization of said allyl monomer or allyl oligomer is diisopropyl peroxydicarbonate.

In the polymerizable liquid composition of the invention, it is preferred that the amount of initiator for the polymerization of the allyl monomer or allyl oligomer is from 0.5% to 20%, more preferably from 1% to 10%, even more preferably from 1.5% to 5% by weight relative to the total weight of the composition.

According to a preferred embodiment of the invention, the polymerizable liquid composition of the invention comprises:

from 90% to 97% of diethylene glycol bis(allyl carbonate);

from 1.5% to 5% of diisopropyl peroxydicarbonate;

optionally, between 0.05% and 0.5% of a light absorbing additive, which is not contained in a nanoparticle, having the following structure

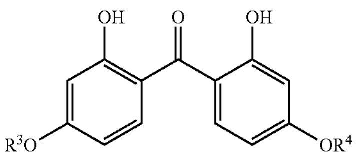

wherein $R^3$ and $R^4$ are each independently chosen from H or an alkyl chain having from 1 to 12 carbon, preferably wherein $R^3$ and $R^4$ are methyl groups;

from 1 to 25 ppm of at least one lake pigment;

with the quantities expressed by weight relative to the total weight of the composition.

Another object of the present invention is a process for the preparation of a polymerizable liquid composition as described above.

Thus, the present invention also relates to a process for the preparation of a polymerizable liquid composition of the invention, which comprises the steps of:

a) providing an allyl monomer or allyl oligomer;

b) providing an initiator for the polymerization of said allyl monomer or allyl oligomer;

c) providing at least one lake pigment;

d) optionally, providing a light absorbing additive other than the at least one lake pigment selected from the group consisting of a colorant such as a dye or a pigment, a colorless light-absorbing additive, and mixtures thereof; preferably the light absorbing additive other than the at least one lake pigment is a UV absorber and/or a HEV-light absorber;

e) mixing said allyl monomer or allyl oligomer, said initiator, said at least one lake pigment, and said light-absorbing additive other than the at least one lake pigment, when applicable.

In the process of the invention, steps a), b), c) and d) are performed in any order before step e).

All the features (individually or in combination) described above for the different elements of the polymerizable liquid composition of course apply to the process for the preparation of said polymerizable liquid composition.

In the process of the invention, it is preferred that, at step c), the at least one lake pigment is provided in the form of a mixture of the at least one lake pigment with an allyl monomer or allyl oligomer, the lake pigment content of said mixture being comprised between 0.01% and 1% by weight relative to the total weight of the mixture, preferably the allyl monomer or allyl oligomer provided at step c) is of the same nature, i.e. comprises the same mixture of compounds, as the allyl monomer or allyl oligomer provided at step a).

The process of the invention may further comprise a step c0) of preparing the mixture of the at least one lake pigment with an allyl monomer or allyl oligomer provided at step c).

The step c0) can help improve the haze of the articles obtained from the compositions obtained by the process of the invention.

Said step c0) may comprise a step of mixing the at least one lake pigment with the allyl monomer or allyl oligomer of step c) and a step of recovering the mixture. Preferably, the step of mixing is performed with agitation, in the presence of milling beads or with sonication or both. Preferably agitation in the presence of milling beads is used. The milling beads may have a diameter of 0.1 mm to 4 mm, preferably of 0.2 mm to 3 mm, more preferably of 1 mm to 2.5 mm. Preferably the milling beads are zirconium oxide beads. More preferably, the agitation in the presence of milling beads is performed with an agitation speed of at least 300 rpm and for at least 1 h. Even more preferably, the agitation in the presence of milling beads is performed using a basket mill, for 1 hour to 6 hours and at an agitation speed of 500 rpm to 3000 rpm, most preferably of 700 rpm to 1500 rpm.

Preferably, step e) of the process of the invention comprises the following steps in the following order:

e1) a step of cooling down the allyl monomer or allyl oligomer provided at step a) and of mixing it with the light absorbing additive provided at step d), when applicable, the cooling down being such that the temperature of the mixture at the end of step e1) is lower than or equal to 5° C., preferably lower than or equal to 2° C.;

e2) a step of adding the initiator to the cooled mixture obtained after step e), while keeping it at the temperature reached at the end of step e1);

e3) a step of adding the at least one lake pigment or, where applicable, the mixture of the at least one lake pigment with the allyl monomer or allyl oligomer provided at step c) to the mixture obtained after step e2), while keeping it at the temperature reached at the end of step e1).

The process of the invention may further comprise a step of filtration of the mixture obtained after step e), preferably wherein a 1 μm filter or lower is used for the filtration.

Another object of the present invention is the use of a lake pigment dispersed in a polymerizable liquid composition as described above as a colorant capable of tolerating an initiator for the polymerization of an allyl monomer or allyl oligomer. Preferably the lake pigment is used as a color balancing agent, more preferably the lake pigment is used for preventing the yellowness of an optical article or of an optical article substrate comprising an allylic polymer.

All the features (individually or in combination) described above for the different elements of the polymerizable liquid composition of course apply to the polymerizable liquid composition in which the lake pigment is used.

Another object of the present invention is a first optical article obtainable or obtained by a process comprising the curing of the polymerizable liquid composition as described above.

All the features (individually or in combination) described above for the different elements of the polymerizable liquid composition of course apply to the polymerizable liquid composition from which the optical article is obtainable or obtained.

In some embodiments, the first optical article of the invention comprises an optical substrate obtainable or obtained by a process comprising the curing of the polymerizable liquid composition as described above.

In some other embodiments, the first optical article of the invention may comprise:

a) an optical substrate;

b) a coating obtainable or obtained by curing the polymerizable liquid composition of the invention on said optical substrate.

A substrate, in the sense of the present invention, should be understood to mean an uncoated substrate, and generally has two main surfaces. The substrate may in particular be an optically transparent material having the shape of an optical article, for example an ophthalmic lens destined to be mounted in glasses. The substrate may act as support for a stack of one or more coatings.

The optical article of the invention may have a haze value of less than 0.5%, preferably less than 0.4%, more preferably less than 0.3%.

Haze is the percentage of transmitted light that, in passing through a specimen, deviates from the incident beam by forward scattering. Haze is measured by light transmission measurements according to ASTM D1003.00. As haze increases, loss of contrast occurs until the object cannot be seen.

The optical article of the invention may have a light-cut value of more than 380 nm, preferably more than 390 nm, even more preferably more than 395 nm.

Light-cut is defined as the lowest wavelength for which the transmittance of the optical article is higher than 1%.

In the case where the optical article is a lens, the light cut is measured for light with a normal incidence on the center of the lens.

The optical article of the invention may have a yellow index of −4 to 4, preferably of −1 to 4, more preferably of −0.5 to 3.

Yellow index (YI) is a colorimetric calculation from tristimulus values (X, Y, Z) according to ASTM E313.

The optical article of the invention may have a relative light transmission factor in the visible spectrum $T_v$ higher than or equal to 85%, preferably higher than or equal to 86%, more preferably higher than or equal to 87%, and better higher than or equal to 88%.

The optical article of the invention may be coated with antireflective coatings on one or both air/substrate interface(s). In such embodiments, To factor preferably ranges from 90% to 99%, more preferably from 90% to 98%, even better from 90% to 97%.

The $T_v$ factor, also called "luminous transmission" of the system, is such as defined in the standard NF EN 1836 and relates to an average in the 380-780 nm wavelength range that is weighted according to the sensitivity of the eye at each wavelength of the range and measured under D65 illumination conditions (daylight).

The optical article of the invention may have a colorimetric coefficient b* as defined in the CIE (1976) L*a*b* international colorimetric system that is lower than or equal to 2.5, preferably lower than or equal to 2, more preferably lower than or equal to 1.5, even more preferably lower than or equal to 1 (for an optical material thickness of 2 mm), and in a general manner higher or equal to 0. The low colorimetric coefficient b* of the optical material can be correlated with its non-yellow appearance.

The colorimetric coefficients a*, b*, C* and h° for a given material are calculated between 380 and 780 nm, for light transmitted through the material at an angle of incidence ranging from 0° to 15°, especially 0°, using standard observer 10° as defined in the international colorimetric system CIE L*a*b* and standard illuminant D65, for an material thickness of 2 mm.

The optical article of the invention is preferably an ophthalmic lens.

Non-limiting examples of ophthalmic lenses include corrective and non-corrective lenses, including single vision or multi-vision lenses (i.e afocal, unifocal, bifocal, trifocal and progressive lenses), which may be either segmented or non-segmented, as well as other elements used to correct, protect, or enhance vision, including without limitation contact lenses, intra-ocular lenses, lenses for augmented reality devices or virtual reality devices, protective lenses (such as sun glasses or sun lenses), goggles (such as goggles for skiing, cycling and motor biking) and visors (such as helmet visors).

In some embodiments, the optical article of the invention is an ophthalmic lens having a haze of less than 0.5%, preferably less than 0.4%, more preferably less than 0.3%, a center thickness of less than 3 mm, a light cut higher than 390 nm, preferably higher than 395 nm, and a yellow index comprised between −1 and 4, preferably of −0.5 to 3.

Another object of the present invention is a second optical article comprising a material obtainable or obtained by curing an allyl monomer or an allyl oligomer, wherein said material comprises at least one lake pigment dispersed therein and wherein said lake pigment is not contained in nanoparticles, which are not the lake pigment itself, if the lake pigment is in the form of particles dispersed in said material.

In some embodiments, said material comprised in the second optical article of the invention further comprises a light absorbing additive other than the at least one lake pigment selected from the group consisting of a colorant such as a dye or a pigment, a colorless light-absorbing additive, and mixtures thereof, preferably the light absorbing additive other than the at least one lake pigment is a UV absorber and/or a HEV-light absorber.

All the features (individually or in combination) described above for the first optical article of the invention apply to the second optical article of the invention.

All the features (individually or in combination) described above for the allyl monomer or allyl oligomer, apply to the allyl monomer or allyl oligomer from which said material comprised in the second optical article of the invention is obtainable or obtained by curing.

All the features (individually or in combination) described above for the lake pigment and for the light absorbing additive other than the at least one lake pigment apply to the elements comprised in the second optical article of the invention.

In said material comprised in the second optical article of the invention, it is preferred that the amount of lake pigment is from 1 to 40 ppm, more preferably from 1 to 25 ppm, even more preferably from 5 to 25 ppm, most preferably from 5 to 15 ppm by weight relative to the total weight of said material.

In said material comprised in the second optical article of the invention comprising a LAA other than the at least one lake pigment, it is preferred that the amount of the light absorbing additive other than the at least one lake pigment is below 2%, more preferably below 1%, even more preferably below 0.5% by weight relative to the total weight of the composition.

In said material comprised in the second optical article of the invention comprising a LAA other than the at least one lake pigment, it is preferred that the amount of LAA is from 0.01% to 2%, more preferably below from 0.02% to 1%, even more preferably from 0.05% to 0.5% by weight relative to the total weight of the composition.

In some embodiments, the second optical article of the invention comprises an optical substrate essentially made of said material obtainable by curing an allyl monomer or an allyl oligomer and comprising a lake pigment dispersed therein.

In some embodiments, the second optical article of the invention comprises an optical substrate and a coating, said coating being essentially made of said material obtainable by curing an allyl monomer or an allyl oligomer and comprising a lake pigment dispersed therein.

EXAMPLES

The optical characteristics of the lenses were determined using a CARY 60 spectrophotometer from AGILENT.

All the lenses prepared were plano lenses with a central thickness of 2 mm.

The light transmission factor in the visible spectrum $T_v$ was measured in transmission mode from a wearer's view angle. $T_v$ was measured under D65 illumination conditions (daylight).

The light cut-off wavelength was determined from the transmission spectra.

The yellowness index Yi of the prepared lenses was calculated as described above, by measuring on a white background with the above spectrophotometer the CIE tristimulus values X, Y, Z such as described in the standard ASTM E 313-05, through reflection measures. This way of measuring Yi, from an observer's view angle, is the closest to the actual wearing situation.

Haze is measured by light transmission measurements using Hazeguard XL-211, according to ASTM D1003-00.

Lake Pigments

In the following examples, three lake pigments having a violet hue were used. These three lake pigments are hereafter named M1 (mixture of a blue lake and a red lake), M2 (comprising a violet lake) and M3 (mixture of blue lake and a red lake) respectively. Their compositions are described in table 1.

TABLE 1

| Lake pigment | Supplier | Names | CAS number | C.I. number | Type of organic colorant | Type of metallic compound | % by weight |
|---|---|---|---|---|---|---|---|
| M1 | Roha | "Lake indigo carmine" | 16521-38-3 | 73015:1 | anionic | $Al^{3+}$ | 70 |
| | | "Food red 7:1" | 12227-64-4 | 16255:1 | anionic | $Al^{3+}$ | 30 |
| M2 | Sun Chemical | "Pigment violet 3" | 1325-82-2 | 42535:2 | cationic | [PWMo] | 100 |
| M3 | Pylam | FD&C Blue #1 aluminum lake | 68921-42-6 | 42090:2 | anionic | $Al^{3+}$ | Proprietary Mixture sold as MX-732A |
| | | "D&C red 27 Aluminum lake" | 15876-58-1 | 45410:2 | anionic | $Al^{3+}$ | |

Color Masterbatches

A color masterbatch comprising the lake pigment and the allylic monomer CR39® is prepared using the following method.

The lake pigment, the allylic monomer CR39® and zirconium beads with a 2 mm diameter from RETSCH are mixed together. This mixture is then either agitated in a bottle with a magnetic stir bar at 400 rpm for at least 12 h or in a 2 L basket mill for 3 h at 1100 rpm. The zirconium beads are then removed from the mixture to recover the masterbatch.

The concentration of the masterbatch in lake pigment is 0.1% by mass relative to the total mass of the master batch.

The average diameter of the particles in the masterbatch and their polydispersity index (PDI) is measured by dynamic light scattering (DLS; 10 mm cuvette; masterbatch diluted 10 times). Results of the DLS measurements are given in table 2 with the average diameter of the particles expressed as a Z-average.

TABLE 2

| Lake pigment | Agitation method | Agitation time | Z-average | PDI |
|---|---|---|---|---|
| M1 | Magnetic stir bar | 12 hours | 234 nm | 0.31 |
| M3 | Magnetic stir bar | 24 hours | 250 nm | 0.12 |

Polymerizable Compositions

Four polymerizable compositions for the manufacture of an ophthalmic lens able to inhibit the transmission of UV light were prepared: three compositions according to the invention C1, C2 and C3 comprising M1, M2 and M3, respectively, as a color-balancing agent and one comparative composition C0 without any color-balancing agent.

Table 3 details the composition of C0-C3 with the amounts given in % by mass relative to the total mass of the composition.

TABLE 3

| Function | Chemical | CAS number | C0 | C1 | C2 | C3 |
|---|---|---|---|---|---|---|
| Allylic monomer I | CR39 ® | 142-22-3 | 94.97 | 94.17 | 94.17 | 94.17 |
| Allylic monomer II | CR39E (disclosed in U.S. Pat. No. 7,214,754) | — | 2 | 2 | 2 | 2 |
| Polymerization initiator | IPP | 105-64-6 | 2.92 | 2.92 | 2.92 | 2.92 |
| UV absorber | Chiguard ® BP6 | 131-54-4 | 0.11 | 0.11 | 0.11 | 0.11 |
| Color-balancing agent | Color Masterbatch (see above) | — | — | 0.8 | 0.8 | 0.8 |

The procedure for the preparation of the polymerizable compositions is as follows:

i. Mix of CR39®, CR39E and Chiguard® BP6 for 1 h at room temperature until complete dissolution of the UV absorber;

ii. Cool down the mixture to a temperature lower than 2° C.;

iii. Add IPP and continue stirring the mixture for 10 minutes while keeping the temperature lower than 2° C.;

iv. Add the color masterbatch and continue stirring the mixture for 10 minutes while keeping the temperature lower than 2° C.;

v. Degas for 30 minutes with a stirring plate with a mixing speed of 200 rpm and degas for 15 minutes without stirring, all the while keeping the temperature lower than 2° C.;

vi. Filter the formulation with a 1 μm filter at 4° C.

Lenses

Four lenses L0-L3 were prepared from compositions C0-C3, respectively using the following procedure.

A 77 mm diameter glass plano mold was filled with the composition using a syringe.

The polymerization reaction was carried out in a regulated electronic oven according to the following cycle: the temperature is set at 48° C. for 8 hours, then gradually increased to 85° C. in 9 hours, then kept constant at 85° C. during 3 hours.

The disassembly of the mold is done at 65° C. The obtained lens is then annealed at 100° C. for 1 hour.

Table 5 details the optical characteristics of lenses L0-L3.

TABLE 4

| Lens | light cut (nm) | $T_v$ (%) | YI | L* | a* | b* | C* | h° | Haze |
|---|---|---|---|---|---|---|---|---|---|
| L0 | 396 | 92.2 | 3.2 | 96.9 | −1.3 | 2.6 | 2.9 | 116.8 | 0.2% |
| L1 | 396 | 90.8 | 2.8 | 96.3 | −1.3 | 2.4 | 2.7 | 118.4 | 0.4% |
| L2 | 396 | 87.5 | −0.3 | 95.0 | −0.9 | 0.6 | 1.1 | 148.5 | 0.4% |
| L3 | 396 | 90.8 | 2.1 | 96.3 | −1.2 | 2.0 | 2.3 | 121.1 | 0.3% |

Stability of the Optical Characteristics

Polymerization Stability

The extent of degradation of the lake pigments happening during the polymerization process was assessed by measuring the absorbance in the liquid composition ($A_{liq}$) and in the solid lens ($A_{sol}$) obtained from that composition at specific wavelengths corresponding to maxima of absorption. $A_{sol}$ and $A_{liq}$ are measured with 2 mm thick samples. The percentage of absorbance loss between the absorbance of the liquid the absorbance of the solid (% loss L-to-S=($A_{liq}$−$A_{sol}$)/$A_{liq}$×100) is given in table 6.

TABLE 5

| Composition and Lens | λ (nm) | % loss L-to-S |
|---|---|---|
| C1-L1 | 580 | 0% |
| C2-L2 | 580 | 53% |
| C3-L3 | 555 | 19% |
| | 638 | 43% |

These % loss L-to-S values are much better than what is obtained with common organic dyes.

Photostability

Lenses L0-L3 were tested using a Q-sun xenon arc test chambers by Q-LAB to assess the photostability of their optical characteristics towards 80 h of exposure to light (xenon arc lamp with an irradiance setting of 0.68 W/m2 at 340 nm).

Table 7 to 9 give the values of the optical characteristic of the lenses at three different measurement times (0, 40 and 80 hours of exposure to light). Each value given in the table corresponds to an average over 12 measurements, the 12 measurements being made on 12 different lenses prepared in the same way (one measurement per lens).

The assessment of the photostability of the lenses is made through the calculation of the parameter ΔE according to the following formula:

$$\Delta E=\sqrt{(L^*_{80h}-L^*_{0h})^2+(a^*_{80h}-a^*_{0h})^2+(b^*_{80h}-b^*_{0h})^2}$$

The optical characteristics of the lens are considered photostable if the ΔE value is below 1.

TABLE 6

| | | $T_v$ (%) | Y.I. | L* | a* | b* | C* | h° | UV cut |
|---|---|---|---|---|---|---|---|---|---|
| L0 | t = 0 h | 92.2 | 3.0 | 96.9 | −1.3 | 2.5 | 2.8 | 117.0 | 396 |
| | t = 40 h | 92.1 | 3.4 | 96.8 | −1.4 | 2.7 | 3.1 | 116.3 | 396 |
| | t = 80 h | 92.1 | 3.4 | 96.8 | −1.3 | 2.8 | 3.1 | 116.1 | 396 |
| | % t40-t0 | −0.1% | 10.9% | −0.1% | 5.8% | 8.6% | 7.9% | −0.6% | 0% |
| | % t80-t0 | −0.1% | 12.2% | 0.0% | 5.0% | 9.2% | 8.3% | −0.8% | 0% |
| | | | | | ΔE = 0.24 | | | | |

TABLE 7

| | | $T_v$ (%) | Y.I. | L* | a* | b* | C* | h° | UV cut |
|---|---|---|---|---|---|---|---|---|---|
| L1 | t = 0 h | 90.5 | 2.3 | 96.2 | −1.3 | 2.1 | 2.5 | 121.7 | 396 |
| | t = 40 h | 90.9 | 2.2 | 96.4 | −1.5 | 2.1 | 2.6 | 124.7 | 396 |
| | t = 80 h | 91.1 | 2.3 | 96.5 | −1.5 | 2.2 | 2.7 | 124.7 | 396 |
| | % t40-t0 | 0.4% | −5.3% | 0.2% | 12.1% | 0.2% | 3.6% | 2.4% | 0% |
| | % t80-t0 | 0.7% | −2.2% | 0.3% | 16.3% | 3.7% | 7.2% | 2.4% | 0% |
| | | | | | ΔE = 0.34 | | | | |

TABLE 9

| | | $T_v$ (%) | Y.I. | L* | a* | b* | C* | h* | UV cut |
|---|---|---|---|---|---|---|---|---|---|
| L2 | t = 0 h | 87.9 | 0.5 | 95.1 | −1.1 | 1.0 | 1.5 | 136.9 | 396 |
| | t = 40 h | 87.6 | 1.1 | 95.0 | −1.2 | 1.4 | 1.8 | 129.6 | 396 |
| | t = 80 h | 87.7 | 1.3 | 95.1 | −1.2 | 1.5 | 1.9 | 128.1 | 396 |
| | % t40-t0 | −0.3% | 147.5% | −0.1% | 6.8% | 38.0% | 22.4% | −5.3% | 0% |
| | % t80-t0 | −0.2% | 183.4% | −0.1% | 7.2% | 46.1% | 27.1% | −6.4% | 0% |
| | | | | | ΔE = 0.48 | | | | |

TABLE 10

| | | $T_v$ (%) | Y.I. | L* | a* | b* | C* | h* | UV cut |
|---|---|---|---|---|---|---|---|---|---|
| L3 | t = 0 h | 91.0 | 1.9 | 96.4 | −1.1 | 1.8 | 2.1 | 121.5 | 395 |
| | t = 40 h | 91.5 | 2.9 | 96.6 | −1.4 | 2.5 | 2.8 | 118.8 | 396 |
| | t = 80 h | 91.6 | 3.1 | 96.6 | −1.4 | 2.6 | 2.90 | 118.2 | 396 |
| | % t40-t0 | 0.6% | 50.4% | 0.2% | 22.7% | 36.6% | 32.8% | −2.2% | 0% |
| | % t80-t0 | 0.7% | 60.3% | 0.3% | 24.2% | 42.8% | 37.8% | −2.8% | 0% |
| | | | | | ΔE = 0.85 | | | | |

The invention claimed is:

1. A polymerizable liquid composition for the manufacture of an optical article, comprising:

a) at least one allyl monomer or allyl oligomer, b) at least one initiator for the polymerization of said allyl monomer or allyl oligomer, and c) at least one lake pigment comprising an organic ionic colorant and at least one compound comprising metal atoms having a charge opposite to that of the organic ionic colorant, wherein the lake pigment is not contained in nanoparticles, which are not the lake pigment itself, if the lake pigment is in the form of particles dispersed in the composition.

2. The polymerizable liquid composition according to claim 1, wherein, an alkaline metal salt of the at least one compound comprising metal atoms or a halide salt of said compound or an acid form of said compound or a basic form of said compound is soluble in water, and/or an alkaline metal salt of the ionic organic colorant or a halide salt of the ionic organic colorant or a conjugate base of the ionic organic colorant or a conjugate acid of the ionic organic colorant is soluble in water.

3. The polymerizable liquid composition according to claim 1, wherein, the ionic organic colorant is anionic and the at least one compound comprising metal atoms is a non-alkali metallic cation selected from $Mg^{2+}$, $Al^{3+}$, $Ca^{2+}$, $Cr^{3+}$, $Mn^{2+}$, $Fe^{2+}$, $Fe^{3+}$, $Co^{3+}$, $Ni^{2+}$, $Cu^{2+}$, $Zn^{2+}$, $Ba^{2+}$, $Sr^{2+}$, and mixtures thereof, or the ionic organic colorant is cationic and the at least one compound comprising metal atoms is an anionic coordination complex comprising metal atoms selected from polyoxometalates, $[Cu_3Fe(CN)_6]^-$, and mixtures thereof.

4. The polymerizable liquid composition according to claim 1, wherein the ionic organic colorant is anionic and the at least one compound comprising metal atoms is a trivalent cation.

5. The polymerizable liquid composition according to claim 1, wherein the ionic organic colorant is anionic and comprises carboxylate groups ($RCO_2^-$) and/or sulfonate groups ($RSO_3^-$).

6. The polymerizable liquid composition according to claim 1, wherein the at least one lake pigment is chosen from:

a phosphomolybdotungstate salt of N-methyl derivatives of 4-[(4-aminophenyl)-(4-methyliminocyclohexa-2,5-dien-1-ylidene)methyl]aniline, a mixture of an aluminium, 7-hydroxy-8-[(4-sulfo-1-naphthalenyl)azo]-1,3-naphthalenedisulfonic acid complex and (E)-3,3'-dioxo-1H,1'H,3H,3'H-[2,2'-biindolylidene]-5,5'-disulfonic acid aluminium, a mixture of dihydrogen (ethyl) [4-[[4-[ethyl(3-sulphonatobenzyl)amino]phenyl](2-sulphonatophenyl)methylene]cyclohexa-2,5-dien-1-ylidene](3-sulphonatobenzyl)ammonium, aluminium salt and dialuminium tris [2-(2,4,5,7-tetrabromo-6-oxido-3-oxoxanthen-9-yl)-3,4,5,6-tetrachlorobenzoate], a mixture of tris[5-amino-4-hydroxy-3-(phenylazo)naphthalene-2,7-disulphonato(2-)]dialuminium and dihydrogen (ethyl)[4-[[4-[ethyl(3-sulphonatobenzyl)amino]phenyl](2-sulphonatophenyl)methylene]cyclohexa-2,5-dien-1-ylidene](3-sulphonatobenzyl)ammonium, aluminium salt.

7. The polymerizable liquid composition according to claim 1, wherein at least a portion of the at least one lake pigment is not dissolved in the at least one allyl monomer or allyl oligomer comprised in the composition, and wherein said portion of the at least one lake pigment is in the form of particles dispersed in the composition, and wherein the size of said particles of the at least one lake pigment is lower than 1 μm.

8. The polymerizable liquid composition according to claim 1, wherein the amount of lake pigment is from 1 to 40 ppm by weight relative to the total weight of the composition.

9. The polymerizable liquid composition according to claim 1, further comprising a light absorbing additive other than the at least one lake pigment selected from the group consisting of a colorant; a colorless light-absorbing additive; and mixtures thereof.

10. The polymerizable liquid composition according to claim 9, wherein the light absorbing additive has the following structure

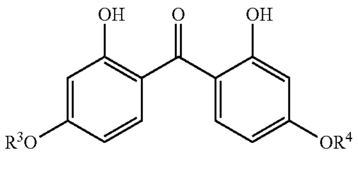

wherein $R^3$ and $R^4$ are each independently chosen from H or an alkyl chain having from 1 to 12 carbon.

11. The polymerizable liquid composition according to claim 9, wherein the light absorbing additive is contained in nanoparticles which are dispersed in the allyl monomer or allyl oligomer.

12. The polymerizable liquid composition according to claim 1, wherein the allyl monomer or allyl oligomer is selected from the group consisting of diethylene glycol bis(allyl carbonate), ethylene glycol bis(allyl carbonate), oligomers of diethylene glycol bis(allyl carbonate), oligomers of ethylene glycol bis(allyl carbonate), bisphenol A bis(allyl carbonate), diallyl phthalate, diallyl isophthalate, diallyl terephthalate, and mixtures thereof.

13. The polymerizable liquid composition according to claim 1, wherein the initiator is selected from a peroxydicarbonate, a peroxycarbonate, a peroxyester, a perketal, and mixtures thereof.

14. A process for the preparation of the polymerizable liquid composition as defined in claim 1, comprising the steps of:

a) providing an allyl monomer or allyl oligomer;

b) providing an initiator for the polymerization of said allyl monomer or allyl oligomer;

c) providing at least one lake pigment;

d) mixing said allyl monomer or allyl oligomer, said initiator, and said at least one lake pigment.

15. A colorant capable of tolerating an initiator for the polymerization of an allyl monomer or allyl oligomer, the colorant comprising a lake pigment dispersed in the polymerizable liquid composition as defined in claim 1.

16. An optical article comprising a material obtainable or obtained by curing an allyl monomer or an allyl oligomer, wherein said material comprises at least one lake pigment dispersed therein and wherein said lake pigment is not contained in nanoparticles, which are not the lake pigment itself, if the lake pigment is in the form of particles dispersed in said material.

17. The optical article according to claim 16 comprising an optical substrate essentially made of said material obtainable by curing an allyl monomer or an allyl oligomer and comprising the lake pigment dispersed therein.

18. The optical article according to claim 16, wherein the optical article is an ophthalmic lens.

19. The polymerizable liquid composition of claim 9, wherein the colorant is a dye or a pigment.

20. The polymerizable liquid composition of claim 10, wherein $R^3$ and $R^4$ are methyl groups.

* * * * *